United States Patent [19]

Chittofrati et al.

[11] Patent Number: 5,017,307

[45] Date of Patent: May 21, 1991

[54] ELECTRICALLY CONDUCTIVE MICROEMULSIONS BASED ON PERFLUOROPOLYETHERS

[75] Inventors: Alba Chittofrati, Milan; Daria Lenti, Alessandria, both of Italy

[73] Assignee: Ausimont S.r.l., Milan, Italy

[21] Appl. No.: 261,227

[22] Filed: Oct. 24, 1988

[30] Foreign Application Priority Data

Oct. 28, 1987 [IT] Italy ............................... 22421 A/87

[51] Int. Cl.$^5$ ............................................. H01B 1/00
[52] U.S. Cl. .................................... 252/500; 524/81; 524/165; 524/319
[58] Field of Search ....................... 252/500, 309, 358; 524/801, 805, 81, 156, 165, 319, 300

[56] References Cited

U.S. PATENT DOCUMENTS

| | | |
|---|---|---|
| 3,665,041 | 5/1972 | Sianesi et al. |
| 4,175,969 | 11/1979 | MacKey .............................. 252/500 |
| 4,313,978 | 2/1982 | Stevens et al. ...................... 252/500 |
| 4,523,039 | 6/1985 | Lagow et al. |
| 4,556,506 | 12/1985 | Frielli et al. ......................... 252/500 |

FOREIGN PATENT DOCUMENTS

| | | |
|---|---|---|
| 0051526 | 10/1981 | European Pat. Off. |
| 0148482 | 12/1984 | European Pat. Off. |
| 0227103 | 12/1986 | European Pat. Off. |
| 0250766 | 4/1987 | European Pat. Off. |

OTHER PUBLICATIONS

J. Am. Chem. Soc. 1985 107, 1197–1201, D. F. Persico, G. E. Gerhardt; and R. J. Lagow "Synthesis of Perfluoro-polyethers via Hydrocarbon Polyesters: A New General Method".

*Primary Examiner*—Josephine Barr
*Attorney, Agent, or Firm*—Stevens, Davis, Miller & Mosher

[57] ABSTRACT

The invention relates to microemulsions of the water-in-oil type (w/o) capable of effecting ionic electric transfer and material interphase transfer, wherein the oily phase consists of a perfluoropolyether having perfluoroalkyl end groups or functional end groups of the hydrophilic type. The microemulsions are obtained using perfluorinated surfactants, in particular having a perfluoroalkylpolyethereal structure, and/or an alcohol as a co-surfactant.

7 Claims, 1 Drawing Sheet

ELECTRICALLY CONDUCTIVE MICROEMULSIONS BASED ON PERFLUOROPOLYETHERS

FIELD OF THE INVENTION

This invention relates to microemulsions of the water-in-oil type.

BACKGROUND OF THE INVENTION

The fluorinated fluids having a perfluoropolyethereal structure (PFPE) exhibit utmost important characteristics such as:
high chemical and thermal stability;
complete immiscibility with water and hydrocarbons;
high gas solubility.

However, their structure and the properties of high water-repellency and very high resistivity do not permit their use in electrochemical processes because or in separation processes, they do not permit either the transfer of substance from solutions or the electric transfer.

Conversely, it could be very useful to have available systems based on perfluoropolyethers capable of providing substance transfer and ionic electric transfer, for use, for example, as membranes in electrochemical processes or in separation processes.

Liquid systems consisting of water-in-hydrogenated oil microemulsions capable of conducting electricity are known in the scientific and patent literature.

However, their formation and their existence, are generally not considered foreseeable.

DETAILED DESCRIPTION OF THE INVENTION

It has now surprisingly been found that it is possible to impart the electrical conductivity and material transfer properties to liquids having a perfluoropolyethereal structure if particular microemulsions of water in the perfluoropolyether liquid are prepared.

"Microemulsion" means a mixture macroscopically consisting of a single limpid of opalescent, optically isotopic phase comprising two immiscible liquids and at least a surfactant.

The microemulsions form spontaneously. Their stability is of the thermodynamic type.

Whenever used herein, the term "microemulsion" means also the systems, wherein the orientation of the molecules at the interphase leads to the formation of not optically isotropic systems, characterized by birefringence and probably consisting of oriented structures of the liquid-crystalline type (liquid crystals).

The microemulsions object of the present invention are mixtures macroscopically consisting of only one limpid or opalescent phase, comprising:
a) an aqueous liquid, optionally containing one ore more electrolytes;
b) a fluid with perfluoropolyethereal structure having perfluoroalkyl or functional end groups, with carboxylic, alcoholic, aminic, polyoxyalkylene-OH, estereal, amidic, etc. functionalities, and preferably functional groups of the hydrophilic type, such as the carboxylic group and the polyoxyalkylene-OH group, and preferably the carboxylic group;
c) a fluorinated surfactant, preferably having a perfluoropolyethereal structure; and/or
a hydrogenated alcohol $C_1$-$C_{12}$, preferably $C_1$-$C_6$, or a fluorinated alcohol (co-surfactant).

The microemulsions of the present invention can be optically isotropic or birefractive, are of the type water-in-oil (w/o) and are characterized int hat they are conductive. Their conductivity is at least 10 microS.cm$^{-1}$ ($\mu$S.cm$^{-1}$) and preferably higher than 100 $\mu$S.cm$^{-1}$.

The composition of the microemulsions object of the present invention are of w/o type. They must contain PFPE as a "continuous phase" by therefore it is preferably that the PFPE phase should be in excess by volume in the aqueous phase.

Both the existence of microemulsions of w/o type and the conductivity characteristics are not foreseeable "a priori". In general, by consequence, the microemulsions of the present invention can be preferably described as the conductive portion of the single-phase areas which are present in the right half of a water/surfactant PFPE ternary diagram representable as it is shown in FIG. 1.

Figure 1:
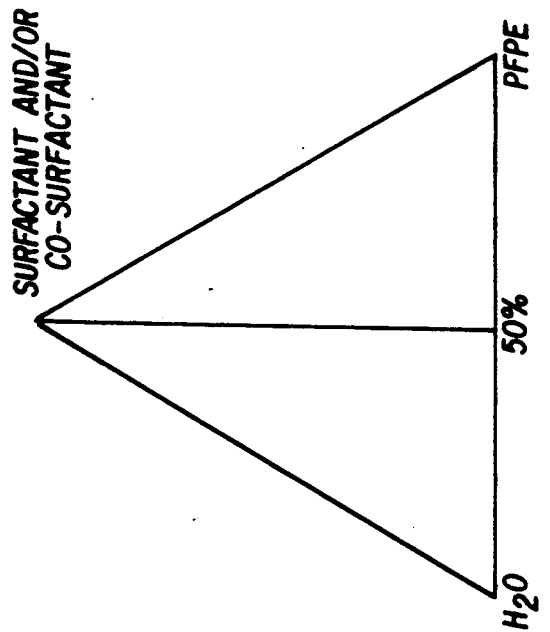

In FIG. 1, the bisecting line of the angle opposed to the water-PFPE base side is characterized by a constant W/PFPE ratio equal to 1.

In principle, however, the presence of single-phase conductive areas of the w/o type also having a W/PFPE ratio higher than 1 cannot be excluded, due to the unforeseability the existence of such systems.

The fact that the microemulsions of the water-in-perfluoropolyether type are within the scope of the present invention can be easily ascertained by those skilled in the art by a simple electric conductivity measurement, as illustrated above.

Perfluoropolyethers (PFPE) suitable for providing the microemulsions of the present invention are:
a) PFPE having an average molecular weight ranging from 500 to 10,000 and preferably from 600 to 6,000, with perfluoroalkyl end groups, and belonging to one or more of the following classes:

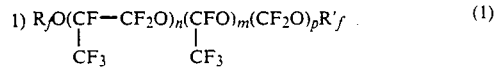

with a random distribution of the perfluorooxyalkylene units, where $R_f$ and $R'_f$, like or different from each other, are —$CF_3$, —$C_2F_5$, —$C_3F_7$, and m, n, p have such average values as to meet the above average molecular weight requirements.

2) $R_fO(CF_2DF_2O)_n(CF_2O)_mR'_f$ with a random distribution of the perfluoroxyalkylene units, where $R_f$ and $R'_f$, like or different from each other, are —$CF_3$ or —$C_2F_5$, and m and n have such average values as to meet the above requirements,

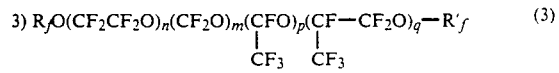

with a random distribution of the perfluorooxyalkylene units, where $R_f$ and $R'_f$, like or different from each other, are —$CF_3$, —$C_2F_5$ or —$C_3F_7$, and m, n, p, q have such average values to meet the above requirements.

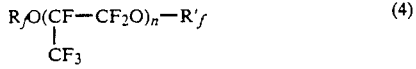

(4)

where $R_f$ or $R'_f$, like or different from each other, are $-C_2F_5$ or $-C_3F_7$ has such a value to meet the above requirements.

5) $R_fO(CF_2CF_2O)_nR'_f$ where $R_f$ and $R'_f$, like or different from each other, $-CF_3-$, $-C_2F_5$, and n has such an average value as to meet the above requirements.

6) $R_fO(CF_2CF_2CF_2O)_nR'_f$ where $R_f$ and $R'_f$, like or different from each other, are $-CF_3$ or $-C_2F_5$ or $-C_3F_7$, and n has such an average value as to meet the above requirements.

b) PFPE belonging to the above classes, having an average molecular weight ranging from 1,500 to 10,000 and preferably lower than 6,000, characterized in that they contain on the average from 0.1 to 2 non-perfluoroalkyl functional end groups for each polymeric chain and preferably from 0.3 to 1.

c) Perfluoropolyethers as are described in patent application No. 20,346 A/86, which corresponds to U.S. patent application Ser. No. 45,541, filed May 4, 1987, in the name of the Applicant hereof, having functional groups along the perfluoropolyethereal chain and end groups of the perfluoroalkyl or functional type.

By the designation "non-perfluoroalkyl functional end groups" and "functional groups in the chain" there are meant, for example, carboxylate, alcoholic, polyoxyalkylene-OH, aminic, quaternary ammonium, amidic, estereal groups.

The functional end groups or the functional groups in the chain which are best suited are those of the hydrophilic type and in particular the carboxylic group.

The functional end groups or the functional groups in the chain, of the above type, can be linked to the perfluoropolythereal chain though a linking group consisting of a divalent non-fluorinated radical of the alkylene or arylene type, containing up to 20 carbon atoms, preferably from 1 to 8 carbon atoms.

As belonging to the perfluoropolyethers to be utilized according to the present invention - - - are to be considered also the ones of classes 1, 2 and 3, containing peroxy bridges in the chain and having acid end groups, obtained as rough products in the photo-oxidation process utilized for the synthesis of the aforesaid PFPE.

Perfluoropolyethers of class 1) are known in commerce under the trademark Fomblin ® Y or Galden ®, the ones of class 2) under the trade-mark Fomblin ® Z, all of them being produced by Montedison.

Products of class 4) known on the market are the Krytox (Du Pont). Those of class 5) are described in U.S. Pat. No. 4,523,039. Those of class 6) are described in European patent EP 148,482 to Daikin.

The ones of class 3) are prepared according to U.S. Pat. No. 3,665,041.

Other suitable perfluoropolyethers are the ones described by Lagow et al. in U.S. Pat. No. 4,523,039 or in J. Am. Chem. Soc. 1985, 107, 1197-1201.

The fluorinated surfactants contained in the microemulsions forming the object of this invention may be either ionic or non-ionic. In particular, the following can be cited:

a) the salts of perfluoroalkylcarboxylic acids having 5 to 11 carbon atoms;
b) the salts of perfluorosulphonic acids having 5 to 11 carbon atoms;
c) the non-ionic surfactants cited in European patent application 0051526, consisting of a perfluoroalkyl chain having a polyoxyalkylene hydrophilic head;
d) the salts of the mono- and bi-carboxylic acids derived from perfluoropolyethers, preferably having average molecular weight not higher than 1000;
e) the non-ionic surfactants consisting of perfluoropolyethereal chain bound to a polyoxyalkylene chain;
f) the perfluorinated cationic surfactants such as those containing 1,2 or 3 perfluoropolyether hydrophobic chains.

The surfactants of the ionic type are preferred.

Furthermore, the system can contain one or more co-surfactants belonging to one of the following classes:
hydrogenated alcohols having 1 to 12 carbon atoms;
alcohols comprising a perfluoropolyethereal chain;
partially fluorinated alcohols.

The aqueous liquid may be composed of water or of an aqueous solution of inorganic electrolytes (salts, acids or alkalis).

The conductive systems are prepared by mixing the individual components and can be identified for example by measuring the variation in the specific conductivity (X) of the oil/surfactant/co-surfactant system upon variation of the composition due to addition of the aqueous solution.

In practice, a sample containing a surfactant (and optionally a co-surfactant) in PFPE is titrated with little portions of the aqueous phase, measuring X after each addition.

By so operating, the possible presence of a composition range corresponding to significant X values is ascertained.

Once the composition corresponding to a sufficiently high X value has been identified, the conductive microemulsion can be prepared simply by mixing the individual components taken in any order.

EXAMPLES

The following examples are to be considered as merely illustrative and limitative of the possible embodiments of the present invention.

EXAMPLE 1

3.5 g of ammonium salt of a monocarboxylic acid having a perfluoropolyethereal structure and belonging to class 1, having an average equivalent weight of 694 and a broad distribution of the molecular weights, were dissolved in 8 ml of PFPE with perfluoroalkyl end groups, belonging to class 1, having an average molecular weight equal to 800, in the presence of 0.3 ml of a perfluoropolyethereal-structure alcohol of class 1, with the end group $-CH_2OH$ and an average equivalent weight of 600.

The resulting mixture was limpid at 20° C. and exhibiting a specific electric conductivity of 7.8 $\mu S.cm^{-1}$ (probably due to traces of $H_2O$ present in the surfactant).

Figure 2:
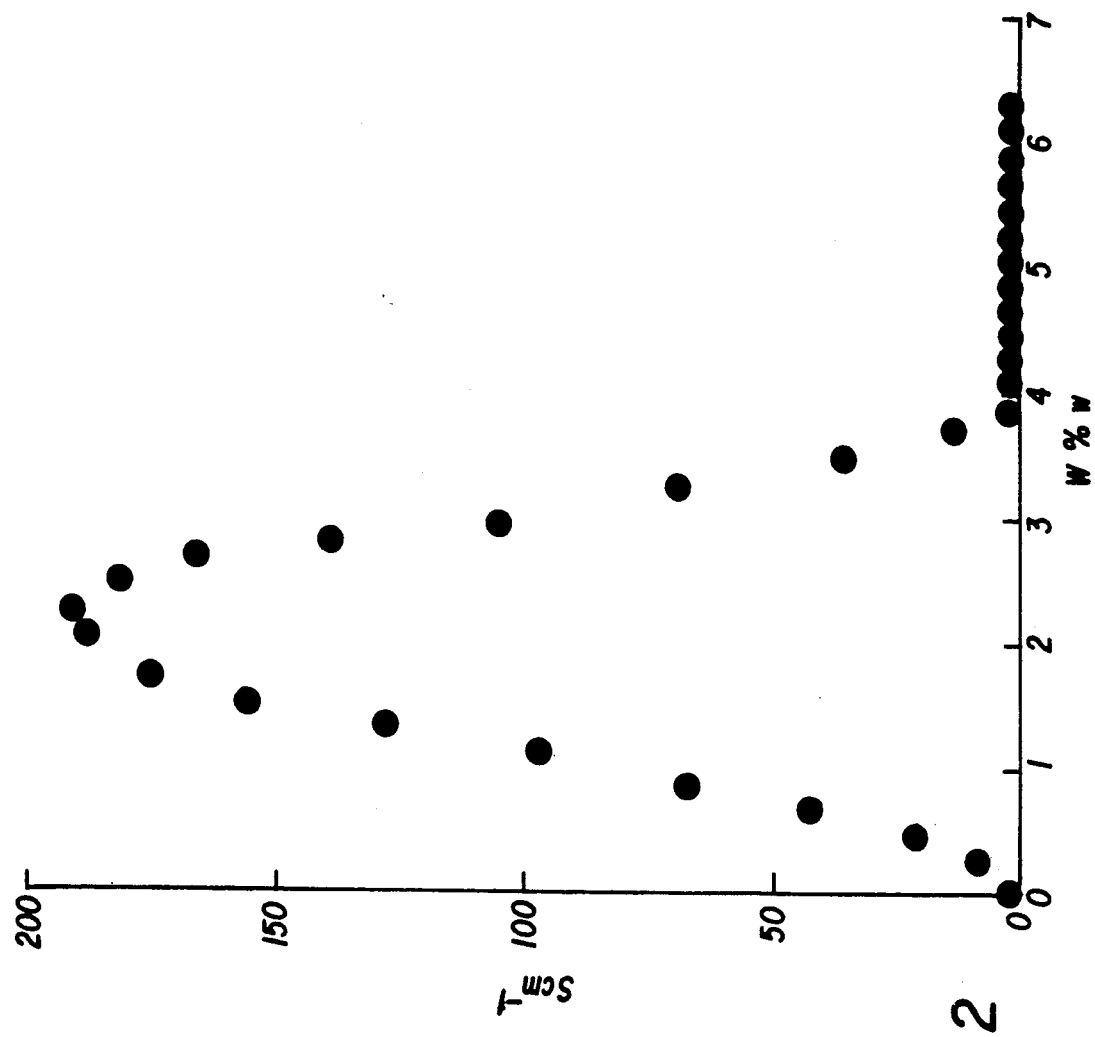

By means of little additions of 0.1 M $HNO_3$ solution, in particular 50 microliters per step, the behaviour shown in FIG. 2 was obtained. There was observed a fast increase of X up to a maximum of 184.1 microS.cm$^{-1}$ for $W=2.2\%$ by weight; by increasing the aqueous phase amount, the conductivity decreased to values lower than 1 microS.cm$^{-1}$ for W=4% by weight and it was no longer measurable above 4.5% in the aqueous phase. However, the system was capable of solubilizing HNO$_3$ solutions up to 10% by weight at T=20° C.

Analogous systems prepared with the surfactant in the form of acid instead of ammonium salt were capable of solubilizing a lower amount of aqueous phase. The microemulsions so obtained did not show electrical conductivity.

1, and having an average equivalent weight of 694 with a wide distribution of the molecular weight;

a PFPE belonging to class 1, having an average molecular weight equal to 800 and perfluoroalkyl end groups;

perfluorinated alcohol H(CF$_2$)$_6$CH$_2$OH as a co-surfactant;

the aqueous liquid consisting of a solution of electrolyte HNO$_3$ and KNO$_3$.

The maximum conductivity of the systems at 20° C., at two different concentrations for each electrolyte is reported in Table 1.

TABLE 1

| MicroE | aqueous phase type | amount (ml) | PFPE g | Surfactant g | Alcohol g | Water % by weight | Specific conductivity milliS.cm$^{-1}$ |
|---|---|---|---|---|---|---|---|
| a | HNO$_3$ 0.1 N | 1.4 | 12.7648 | 9.7699 | 2.1857 | 5.36 | 0.9 |
| b | HNO$_3$ 0.01 N | 1.75 | 12.7659 | 9.7699 | 2.1857 | 6.61 | 1.3 |
| c | KNO$_3$ 0.1 N | 1.60 | 12.7659 | 9.7699 | 2.1857 | 6.08 | 1.1 |
| d | KNO$_3$ 0.01 N | 1.75 | 12.7659 | 9.7699 | 2.1857 | 6.61 | 1.3 |

EXAMPLE 2

5.5072 g of ammonium salt of a monocarboxylic acid with a perfluoropolyethereal structure belonging to class 1, having an equivalent weight of 692 and a narrow molecular weight distribution, were dissolved in 10.2862 g of PFPE having perfluoroalkyl end groups, belonging to class 1, and having an average molecular weight equal to 800.

Following the procedure described in the preceding example and with an equilibration time of 4 minutes per step, the conductivity trend on increasing of the water content at T=22° C. was measured. Bidistilled water having a conductivity of about 1 microS.cm$^{-1}$ was used. In the resulting w/o microemulsion, a rapid conductivity increase up to a maximum of 2.33 milliS.cm$^{-1}$ for W=2.77%−3.07% by weight was observed; by increasing the water amount, the conductivity decreased down to values lower than 1 microS.cm$^{-1}$ for W>11.3% by weight. The microemulsion, limpid at 22° C., was capable, however, to solubilize H$_2$O up to 15% by weight without any variation in the macroscopic characteristics of the system.

EXAMPLE 3

6.0309 g of ammonium salt of a monocarboxylic acid with perfluoropolyethereal structure belonging to class 1, having an average equivalent weight of 694 and a broad molecular weight distribution, were dissolved in 11.2348 g of PFPE having perfluoroalkyl end groups and belonging to class 1 and having an average molecular weight equal to 800. At 26° C. the system was turbid, but by addition of 1.25 ml of bidistilled water (W=6.75% by weight), a limpid microemulsion having a conductivity=7.2 milliS.cm$^{-1}$ was obtained. By going on adding water, the sample became turbid and the viscosity increased; the system containing 3.30 ml of water (W=16.05% by weight) was an opalescent gel having a specific conductivity equal to 3.06 milliS.cm$^{-1}$. This gel was slightly birefractive when observed between two crossed polarizers.

EXAMPLE 4

This example illustrates the behaviour of a microemulsion (microE) containing:
an ammonium salt of a monocarboxylic acid having a perfluoropolyethereal structure, belonging to class By raising the water phase concentration, the conductivity decreased from the indicated values down to zero.

The maximum amount of solubilizable water at 20° C. without variation in the macroscopic properties of the microemulsions (microE) is reported in Table 2.

TABLE 2

| Type of MicroE | Maximum amount of solubilizable W (% by weight) |
|---|---|
| a | 15.2 |
| b | 25.0 |
| c | 17.2 |
| d | 23.0 |

If instead of the ammonium salt of the surfactant, the monocarboxlic acid was utilized, no system capable of a significant conductivity was ever obtained.

EXAMPLE 5

A sample containing: 9.5751 g of ammonium salt of a monocarboxylic acid having perfluoropolyethereal structure, belonging to class 1, with a narrow molecular weight distribution, having an equivalent weight of 520, +6.4839 g of PFPE with perfluoroalkyl end groups, belonging to class 1, having an average molecular weight of 800, +4.1970 g of an alcohol having a perfluoropolyethereal structure of class 1 with end group —CH$_2$OH, having an average molecular weight of 678, +1.5 ml of bidistilled water (10.2% by weight), exhibited a specific conductivity equal to 3.34 milliS.cm$^{-1}$, and appeared in the form of a limpid and optically isotropic phase.

By going on adding water up to 30% by weight, a conductivity decrease down to 21.5 microS.cm$^{-1}$ and a viscosity increase of the limpid system were observed.

EXAMPLE 6

A sample containing: 8.6186 g of ammonium salt of a monocarboxylic acid with perfluoropolyethereal structure belonging to class 1, having a narrow molecular weight distribution and an average equivalent weight of 847, 13.2122 g of PFPE with perfluoroalkyl end groups belonging to class 1, having an average molecular weight of 1500, and 0.6 ml of water (2.67% by weight), exhibited a specific conductivity equal to 414 microS.cm$^{-1}$. The system was a limpid, highly viscous liquid.

EXAMPLE 7

16.992 g of a rough perfluoropolyether belonging to class 1, having an average equivalent weight of 7,000 and an average viscosimetric molecular weight equal to 4,000, containing peroxy bridges and acid end groups, neutralized with 0.3 ml of an ammonia solution at 30% by weight of NH$_3$, were additioned with 3.74 ml of tert.butyl alcohol under gently stirring for a few minutes.

The resulting product was limpid at 20° C. and exhibited a specific conductivity of about 16 microS.cm$^{-1}$.

After addition of little amounts of bidistilled water, usually 100 microliters per step, a specific conductivity increase up to a maximum value of 1.3 milliS.cm$^{-1}$, corresponding to a water amount equal to 19% by weight, was observed.

By increasing the aqueous phase amount, the specific conductivity decreased almost symmetrically, with respect to its increase, down to a X value of 700 microS.cm$^{-1}$ in relation to 25% by weight of water.

Beyond this percentage, the system was no longer able to solubilize water.

EXAMPLE 8

16.992 g of a rough perfluoropolyether belonging to class 1, having an average equivalent weight of 7,000 and an average viscosimetric molecular weight of 4,000, containing peroxy bridges and acid end groups, were neutralized with 0.3 ml of an ammonia solution at 30% by weight of NH$_3$ and were dissolved in 3.74 ml of t.butanol under gentle stirring.

A mixture consisting only of a limpid phase at 20° C., which exhibited a specific conductivity of about 16 microS.cm$^{-1}$ was obtained.

By adding little amounts of 10$^{-2}$ M NHO$_3$ solution, generally 100 microliters per step, it was possible to observe an increase of the specific conductivity up to a maximum value of 1.76 milliS.cm$^{-1}$ corresponding to a water phase amount of about 23% by weight.

By increasing the water phase amount, the specific conductivity decreased to a value of 900 microS.cm$^{-1}$ at 28.6% by weight of aqueous solution.

Beyond this percentage, the system was no longer able to solubilize the aqueous phase.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A water-in-oil microemulsion having an electrical conductivity of at least 10 microSiemens.cm$^{-1}$, consisting of a liquid, limpid or opalescent, macroscopically monophase substance, obtained by mixing:
   (a) water;
   (b) a liquid compound with perfluoropolyethereal structure having perfluoroalkyl end groups having the structure of formulas 1 to 6, with an average molecular weight from 500 to 10,000, and perfluoropolyethers of formulas 1 to 6 as herein above defined having an average molecular weight from 1,500 to 10,000, and from 0.1 to 2 non-perfluoroalkyl functional end groups for each chain, selected from: carboxyl, polyoxyalkylene-OH, alcoholic, aminic, amidic hydroxyl, quaternary ammonic ester selected from perfluoropolyethers of formulas 1 to 6:

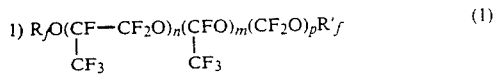

with a random distribution of the perfluorooxyalkylene units, where R$_f$ and R$'_f$, like or different from each other, are —CF$_3$, —C$_2$F$_5$, —C$_3$F$_7$, and m, n, p have such average values to meet molecular weight requirements;

(2) R$_f$O(CF$_2$CF$_2$O)$_n$(CF$_2$O)$_m$R$'_f$ with a random distribution of the perfluorooxylalkylene units, where R$_f$ and R$'_f$, like or different from each other, are —CF$_3$ or —C$_2$F$_5$, and m and n have such average values to meet the average molecular weight requirements;

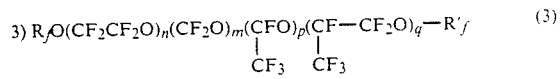

with a random distribution of the perfluorooxyalkylene units, with R$_f$ and R$'_f$, like or different from each other, are —CF$_3$, —C$_2$F$_5$ or —C$_3$F$_7$, and m, n, p, q have such average values to meet the average molecular weight requirements;

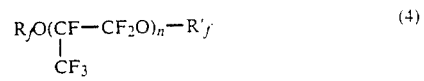

wherein R$_f$ or R$'_f$, like or different from each other, are —C$_2$F$_5$ or —C$_3$F$_7$ and n has such a value to meet the average molecular weight requirements;

5) R$_f$O(CF$_2$CF$_2$O)$_n$R$'_f$ where R$_f$ and R$'_f$, like or different from each other, are —CF$_3$, —C$_2$F$_5$, and n has such an average value as to meet the average molecular weight requirements; and 6) R$_f$O(CF$_2$CF$_2$CF$_2$O)$_n$R$'_f$ where R$_f$ and R$'_f$, like or different from each other, are —CF$_3$ or —C$_2$F$_5$ or —C$_3$F$_7$, and n has such an average value to meet the average molecular weight requirements, and (c) a fluorinated surfactant.

2. Microemulsions according to claim 1, wherein the perfluorinated surfactant is selected from:
   (a) the salts of the perfluoroalkylcarboxylic acids having 5 to 11 carbon atoms;
   (b) the salts of the perfluorosulphonic acids having 5 to 11 carbon atoms;
   c) the salts of the mono- and bi-carboxylic acids derived from perfluoropolyethers;
   d) the cationic perfluorinated surfactants or those derived from perfluoropolyethers having 1,2 or 3 hydrophobic chains.

3. Microemulsions according to claim 1, wherein the fluorinated surfactant is non-ionic consisting of a perfluoroalkyl chain and of a polyoxyalkylene hydrophilic head.

4. Microemulsions according to claim 1, wherein the perfluoropolyether exhibits functional groups along the chain.

5. Microemulsion according to claim 1 comprising a co-surfactant of at least one compound selected from the group consisting of hydrogenated alcohols containing from 1 to 12 carbon atoms and fluorinated alcohols.

6. Microemulsion according to claims 1 and 5 wherein the fluorinated surfactant is ionic.

7. Microemulsion according to claims 1 and 5 wherein the water contains one or more electrolytes.

* * * * *